3,031,266
PRODUCTION OF BARIUM OXIDE
John A. Scarlett, Modesto, Calif., assignor to FMC
Corporation, a corporation of Delaware
No Drawing. Filed Aug. 14, 1959, Ser. No. 833,676
6 Claims. (Cl. 23—186)

This invention relates to the production of barium oxide, and particularly to the production of a useful bulk barium oxide product assaying high in barium oxide.

Barium oxide conveniently is prepared by reaction of barium carbonate with carbon, in accordance with the following equation:

$$BaCO_3 + C \rightarrow BaO + 2CO$$

A desirable method for carrying out this reaction, involves mixing the two reactants and heating them together to about 1800° to 2200° C., for example in an electric arc furnace, whereby a molten, bulk calcination product is formed. This product contains unreacted barium carbonate, along with barium oxide and carbon monoxide. The carbon monoxide which is evolved passes off, and the remaining ingredients of the calcination product are either cooled together into a solid ingot, or "tapped" out of the furnace and cooled.

While this process has been employed commercially for a number of years, it suffers several drawbacks. It has been found impossible in practice to maintain uniform temperatures in the molten reaction mixture, which frequently weighs several tons or more. For this reason, the conversions of barium carbonate to barium oxide in different portions of the reaction mixture vary by as much as 10% or more, with portions containing as much as 98% of barium oxide, and other portions containing as little as 85 to 90% of barium oxide. This means that the average barium oxide content of the mixture is only about 92 to 95%, and when it is necessary to provide a uniform barium oxide product having an average barium oxide content as high as about 96 to 98%, the bulk calcination product must be comminuted, and portions of the product having low barium oxide contents recharged to the reaction mixture for further conversion. It is apparent that this is a costly and time consuming operation.

These difficulties have led to a number of attempts to produce a uniform barium oxide product assaying high in barium oxide. One method involved calcining and reacting barium carbonate and carbon while they are under reduced pressure, in order to remove essentially all of the carbon monoxide liberated in the calcination, and therefore to drive the reaction nearer to completion. While high assay barium oxide has been obtained by this method, several principal disadvantages have accompanied its use.

The provision of a vacuum in an electric arc furnace or equivalent heating chamber requires complex equipment, which is difficult to maintain in operating condition. In addition, it is difficult to heat the reaction charge uniformly in the vacuum chamber, so that the batch temperature is erratic. Furthermore, when the calcination of barium carbonate is conducted in a vacuum, the calcination product which results is extremely porous, having a very low bulk density. While a low density product is desirable for some uses, it is highly reactive with moist air and carbon dioxide, and therefore is expensive to handle and ship and in many instances is not marketable in competition with dense barium oxide.

Accordingly, although the technique of reacting barium carbonate and carbon under vacuum has been known since the early 1900's, it has not been adopted commercially, and the technique of producing high assay barium oxide by comminuting and mechanically sorting barium oxide produced in an electric arc furnace has continued in use.

It is a feature of this invention to provide a method of producing dense barium oxide having a high barium oxide content.

It is a further feature to provide such a method which produces the desired product directly, without resort to mechanical sorting and handling, and which operates in simple, easily maintained equipment.

It has now been found that if barium carbonate and carbon are calcined at a temperature of about 1800° to 2200° C., until a dense, liquid bulk calcination product assaying at least about 85% barium oxide is produced, this bulk product may be readily upgraded in barium oxide content, without substantial reduction of its density. The upgrading treatment comprises withdrawing it from the calciner, and subjecting it, while it is in dense, massive form, to a sub-atmospheric pressure of less than about 450 mm. of mercury, and preferably at less than about 20 mm. of mercury, at a temperature above about 1000° C. Surprisingly, this treatment of a dense, massive material results in a substantial chemical change in the mass, namely, in an increase in its barium oxide content, without an important decrease in its density.

The temperature employed in the treatment will vary with the pressure employed. At operating pressures approaching 450 mm. of mercury, a temperature of 1400° C. or higher, e.g. up to calcination temperatures will be employed, whereas when pressures as low as 1 to 2 mm. of mercury are employed, the treatment may be conducted at temperatures as low as 1000° C. The melting temperature of a bulk calcination product assaying 85% barium oxide is about 1650° C., whereas the melting temperature of a bulk calcination product assaying 90% barium oxide is about 1750° C. The melting temperature of pure barium oxide is about 1920° C. Normally, the present upgrading operation will be carried out when the mass, at least in its outer shell, has cooled below its melting temperature. In this condition the mass will not flow under its own weight, and therefore may be termed self-sustaining.

The upgrading treatment is conducted on a barium oxide-containing calcination product which is in dense bulk form, that is which is in large pieces ranging in size from an average diameter of about 1 to 2 inches, to large sections weighing up to several tons. Furthermore, the treatment is applied to the bulk calcination product when it is a massive non-agitated body, and preferably at least its exterior portion is at a temperature sufficiently low to prevent the mass from flowing under its own weight.

Accordingly, it is quite unexpected that simply reducing the pressure of the atmosphere surrounding the large, dense mass of calcination product, a treatment which can be carried out in common, easily maintained equipment, will effect the present important change in the chemical constitution of the mass. However, it has been found possible by the present treatment to upgrade the barium oxide content of a calcination product by as much as several percent, for example to upgrade a calcination product having an average barium oxide content of 94% to an average content of about 96 to 97%.

This increase in purity is of considerable importance. Barium oxide is used for example in the production of organic barium derivatives which are employed as lubricating oil additives, and also in the production of barium peroxide. In both cases, the presence of impurities in the barium oxide is disadvantageous, and leads to seriously inferior products. Thus, the increase of several percent in barium oxide content of the calcination product is of importance commercially. In addition to the improvement in barium oxide assay, it is important that the density of the barium oxide produced by this method is high, differing from the density of the calcination product only in an unsubstantial amount, e.g. by about 10 to 20% of its original value.

The present process is an adjunct to the production of barium oxide by the calcination of barium carbonate and carbon. In the calcination, barium carbonate is mixed with about 5 to 8% of its weight of carbon, and the mixture is charged into a heating furnace, suitably of the electric arc type. The charge is heated to about 1800° to 2200° C. until its average barium oxide content is about 85 to 95%. It is then either permitted to cool in the furnace until it can be removed as a self-supporting bulk product, that is until its outer portion has dropped to a temperature of about 1600° to 1700° C., or it is poured out of the furnace into a suitable vessel. The calcination product at this stage is in the form of a dense bulk product, in commercial practice weighing as much as several tons.

In accordance with the present process, the bulk calcination product is treated by exposure to a sub-atmospheric pressure. While it is desirable for operating reasons to treat the bulk product in the form in which it is obtained, it is possible to sub-divide it into pieces as small as one to two inches in average diameter, for treatment. The treatment is carried out when the bulk product is at a temperature which is above about 1000° C., but below the calcining temperature. The interior of the bulk calcination product being treated frequently will be at a temperature above its melting point. However, in preferred practice there is at least an outer shell of solidified product of sufficient thickness to keep the bulk from flowing under its own weight. The melting temperature of a bulk calcination product assaying about 85% barium oxide is about 1650° C., while that of a product assaying about 90% barium oxide is about 1750° C.

The present treatment is carried out upon removal of the calcination product from the calcining furnace. When this is done, the residual heat in the calcination product supplies all or most of the heat required for conversion of residual barium carbonate to barium oxide. Where desired, additional heat may be supplied by conventional means. In those cases in which the bulk calcination product cannot be conveniently subjected to the action of a sub-atmospheric pressure immediately upon its removal from the calcining furnace, external heat may be supplied by conventional means to raise its temperature to at least 1000° C. When the bulk calcination product has been cooled to below 1000° C., and brought back to this temperature by external heating, portions of the interior of the mass may not reach this desired minimum temperature. It has been found that conversion of residual barium carbonate in the bulk product in portions of the product which are at the proper elevated temperature, will occur under these conditions.

The pressure of the atmosphere in which the present process is conducted is less than about 450 mm. of mercury, and preferably at less than about 20 mm. of mercury, with lower pressures being required at lower treating temperatures. Thus, when the temperature of the calcination product being treated is at a temperature of about 1000° C., the pressure in the treating atmosphere should be on the order of no more than a few millimeters of mercury. When the calcination product being treated is at a temperature of about 1400° C. or more, the treatment may be conducted in an atmosphere having a pressure as high as 450 mm. of mercury, although even at such high temperatures, treatment at lower pressures results in better and faster upgrading of the calcination product.

The treatment may be conducted in any suitable vessel which is capable of maintaining a vacuum and which is equipped for attachment to a vacuum source. Preferably the vessel will be insulated to retard heat loss from the calcination product being treated. Typically, an insulated cast iron pan having a vacuum tight cover, and fitted for attachment to a vacuum source and desirably with heating elements, can be employed. Another useful apparatus is an autoclave provided with a vacuum source and with heating means. It will be seen that no cumbersome or complicated equipment is required for operation of the present process, and that maintenance problems in the equipment employed are at a minimum.

The present treatment normally is completed in from a few minutes to about one hour, depending on the size and configuration of the bulk calcination product being treated, its initial average barium oxide purity, and on the temperature and pressure employed in the treatment. It will be apparent that small, thin pieces will be upgraded more rapidly than large, thick pieces, whereas the treatment will proceed more rapidly at high temperatures and low pressures, than at low temperatures and high pressures.

The bulk calcination product treated in accordance with the present process must have an average barium oxide content of at least about 85% barium oxide, if the desired high density is to be obtained. Normally, the calcination product treated will have an average barium oxide content of about 90 to 95%, and will vary in barium oxide content throughout its bulk by as much as about 10%. After a typical treatment in accordance with the present process, the average barium oxide content of the treated product will be as high as 96 to 97%, and the variation in barium oxide content throughout the treated product will be much less than it was prior to treatment.

The following examples are presented by way of illustration of the present process only, and are not intended to impose limitations on its scope.

*Example 1*

A mixture comprising 1200 lbs. of barium carbonate and 80 lbs. of carbon black was introduced into an electric arc tapping furnace, and melted and calcined for 30 minutes at a temperature ranging from 1800° to 2000° C. The melted mixture was then tapped into a cast iron pan measuring 32 inches x 21 inches x 9 inches.

The calcination product was permitted to cool to room temperature, and the resulting 32 inches x 21 inches x 8 inches block, weighting about 900 lbs., was broken into one inch to three inch diameter pieces. The average barium oxide content of the calcination product was 93.2%, the individual pieces varying from about 89 to 97%. The density of the product was about 3.6.

*Example 2*

The procedure of Example 1 was repeated through the point where the calcination product was tapped into the cast iron pan. Samples of the calcination product were removed and cooled to room temperature, and found to have an average barium oxide content of 93.3%.

Within 5 minutes after the calcination product was tapped into the cast iron pan, it was placed into a steel chamber equipped with vacuum-tight door, a vacuum gauge, and connected to a three-stage steam ejector for reduction of pressure. The pressure within the chamber was reduced to about 43 mm. of mercury in 3 minutes, and continually reduced to a minimum of about 3 mm., after which the cover of the chamber was removed and the treated product was permitted to cool to room temperature. The treatment was completed in 30 minutes. The temperature of the exterior portion of the bulk calcination product at the time the cover was placed on the pan was 1300° C.; at this temperature the bulk product was a self-sustaining mass. When the cover was removed, after the vacuum treatment, the surface of the treated product was at a temperature of about 900° C.

The treated calcination product was broken into pieces averaging about 1 to 3 inches in diameter. It was analyzed and found to have an average barium oxide content of 95.9%, ranging from 93 to 99%. This represented a 2.7% increase in barium oxide content over the product of Example 1, and a 2.6% increase over the untreated samples taken from the calcination product of this example. The density of the treated product was about 3.35.

*Example 3*

Example 2 as repeated, except that the vacuum was maintained for 20 minutes rather than for 30 minutes. The barium oxide content of the treated product was 95.4%, ranging from 93 to 99%. This represented an increase of 2.2% over the barium oxide calcination product of Example 1, and of 2.4% over untreated samples of the calcination product of this example.

*Example 4*

A piece of a calcination product produced by the procedure of Example 1, having an average diameter of about one inch and a barium oxide content of 86.9%, was placed in an Alundum boat and heated at 1100° C. for 6 hours in a tube furnace maintained at a pressure of 5 mm. of mercury. The treated calcination product was permitted to cool to room temperature in an argon atmosphere. It was found to have a barium oxide content of 96.8%.

*Example 5*

A piece of a bulk calcination barium oxide product produced by the method of Example 1, having an average diameter of about three inches and having a barium oxide content of 95.5%, was placed in a graphite crucible and heated in a vacuum furnace at 1150° C. for 30 minutes. The pressure during the heating treatment was 9 mm. of mercury. The treated calcination product was then cooled to room temperature in an argon atmosphere. It was found to have a barium oxide content of 97.7%.

*Example 6*

A piece of a calcination product prepared by the procedure of Example 1, having an average diameter of about 1½ inches and a barium oxide content of 94.8%, was placed in an Alundum boat and heated in a tube furnace maintained at 1200° C. for one hour, at a pressure of 20 mm. of mercury. The treated calcination product was permitted to cool to room temperature in an argon atmosphere. It was found to have a barium oxide content of 95.9%.

*Example 7*

A piece of a bulk calcination barium oxide product produced by the method of Example 1, having an average diameter of about 2 inches and a barium oxide content of about 95.1%, was placed in a graphite crucible and heated in a vacuum furnace at 1550° C. for 45 minutes. The pressure of the system during the heating treatment was 450 mm. of mercury. The treated calcination product was then cooled to room temperature in an argon atmosphere. It was found to have a barium oxide content of 96.0%.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Method of producing high assay, dense barium oxide, comprising calcining in a calcination zone at atmospheric pressure and at a temperature of at least about 1800° C. a mixture of barium carbonate and carbon to provide a calcination product containing at least about 85% of barium oxide along with barium carbonate, withdrawing the calcination product from the calcination zone and thereafter subjecting it while it is in massive form, its exterior portion being at a temperature of at least about 1000° C. and no higher than about 1700° C. at which temperature it forms a flow resistant shell, and its interior being at a temperature above its melting point, to the action of a reduced pressure of less than about 450 mm. of mercury, whereby the barium oxide content of said calcination product is increased and its density is substantially unaffected.

2. Method of claim 1 in which the temperature of calcination is about 1800° C. to 2200° C.

3. Method of claim 2 in which the reduced pressure is less than about 20 mm. of mercury.

4. Method of claim 3 in which the barium oxide content of the calcination product is at least 90%.

5. Method of producing high assay, dense barium oxide, comprising calcining in a calcination zone at atmospheric pressure and at a temperature of at least about 1800° C. a mixture of barium carbonate and carbon to provide a calcination product containing at least about 85% of barium oxide along with barium carbonate, withdrawing the product from the calcination zone and thereafter subjecting it while it is in massive form, its exterior portion being at a temperature of at least about 1000° C. and no higher than about 1700° C. at which temperature it forms a flow-resistant shell, and its interior being at a temperature above about 1000° C., to the action of a reduced pressure of less than about 450 mm. of mercury, whereby the barium oxide content of such calcination product is increased and its density is substantially unaffected.

6. Method of claim 5 in which the reduced pressure is less than about 20 mm. of mercury.

References Cited in the file of this patent

UNITED STATES PATENTS

| | | |
|---|---|---|
| 1,041,583 | Bornemann | Oct. 15, 1912 |
| 1,305,618 | Pierce | June 3, 1919 |
| 1,326,332 | Fleck | Dec. 30, 1919 |
| 1,729,428 | Lawson | Sept. 24, 1929 |